United States Patent
Hsu

(10) Patent No.: US 8,446,130 B2
(45) Date of Patent: May 21, 2013

(54) CHARGING CIRCUIT

(75) Inventor: Ming-Yuan Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 323 days.

(21) Appl. No.: 12/871,937

(22) Filed: Aug. 31, 2010

(65) Prior Publication Data

US 2012/0007566 A1    Jan. 12, 2012

(30) Foreign Application Priority Data

Jul. 12, 2010  (TW) .................. 99122846 A

(51) Int. Cl.
*H02J 7/14* (2006.01)
*H02J 7/00* (2006.01)

(52) U.S. Cl.
USPC ........... 320/162; 320/107; 320/152; 320/157; 320/151; 320/159

(58) Field of Classification Search
USPC ........................................................ 320/162
See application file for complete search history.

(56) References Cited

U.S. PATENT DOCUMENTS

| | | | | |
|---|---|---|---|---|
| 5,371,456 | A  * | 12/1994 | Brainard | 320/161 |
| 5,465,039 | A  * | 11/1995 | Narita et al. | 320/164 |
| 6,252,375 | B1 * | 6/2001 | Richter et al. | 320/127 |
| 6,906,498 | B2 * | 6/2005 | Breuch et al. | 320/145 |
| 2003/0214268 | A1* | 11/2003 | Breuch et al. | 320/128 |
| 2006/0181242 | A1* | 8/2006 | Freed et al. | 320/109 |
| 2008/0074085 | A1* | 3/2008 | Chang | 320/162 |

* cited by examiner

*Primary Examiner* — Yalkew Fantu
(74) *Attorney, Agent, or Firm* — Altis Law Group, Inc.

(57) ABSTRACT

A charging circuit for charging a battery includes a processor, a switching circuit, a voltage converter, and a power voltage detecting circuit. A first terminal of the switching circuit is connected to a power source. A second terminal of the switching circuit is connected to a first output of the processor. A first terminal of the voltage converter is connected to a third terminal of the switching circuit. A second terminal of the voltage converter is connected to the battery. The power voltage detecting circuit is connected to the power source, and a first input and a second output of the processor.

6 Claims, 1 Drawing Sheet

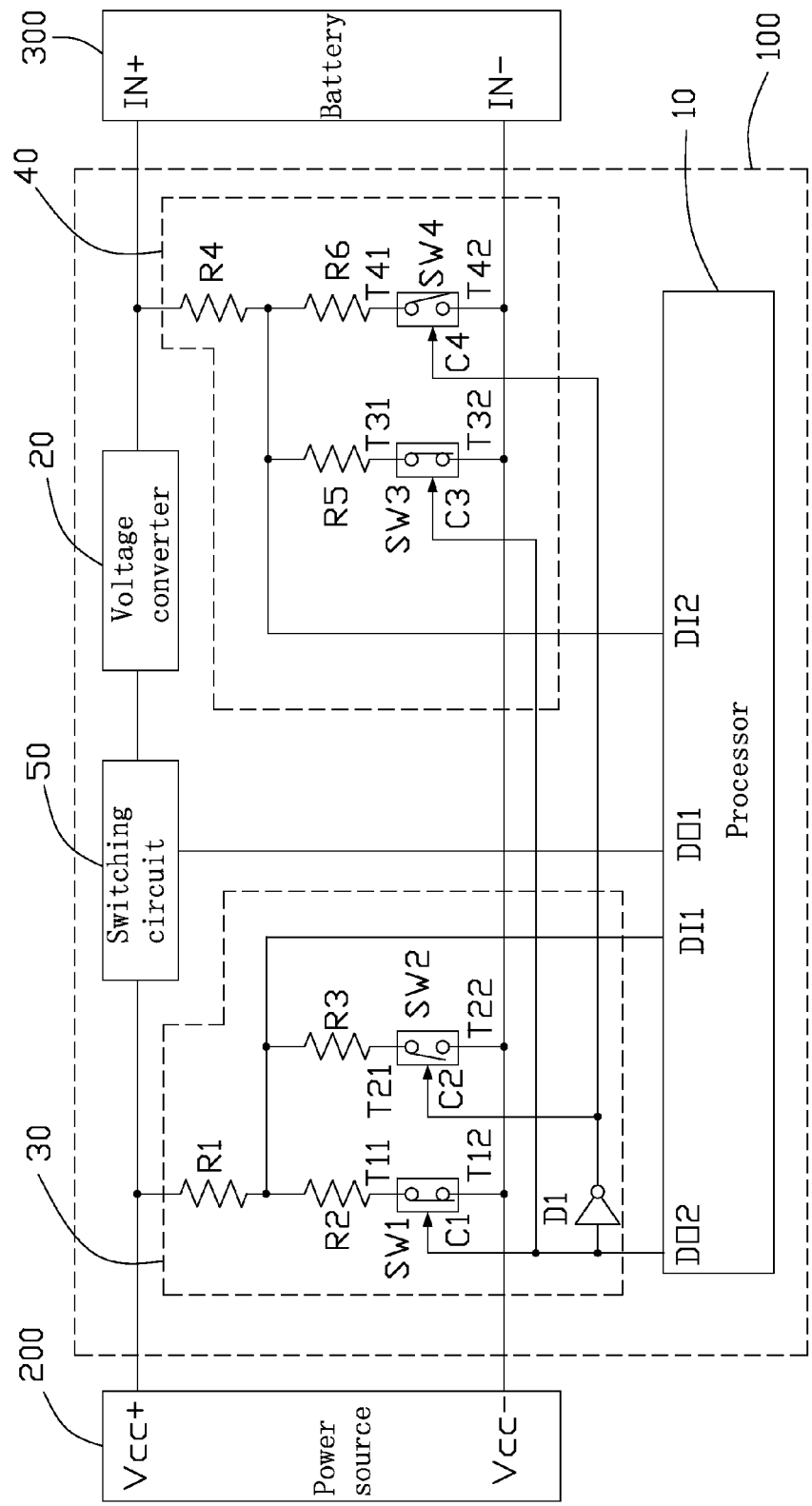

CHARGING CIRCUIT

BACKGROUND

1. Technical Field

The present disclosure relates to a charging circuit.

2. Description of Related Art

Some charging circuits can charge 12 volt (V) batteries and 24V batteries. A charging circuit converts voltage of a 16V-45V power source to 24V when charging a 24V battery. The charging circuit converts voltage of an 8V-22.5V power source to 12V when charging a 12V battery. The charging circuit includes a processor, a detecting circuit, and a switch. The detecting circuit detects the voltage of the power source and sends out a detecting signal. The processor receives the detecting signal and controls the switch to disconnect the power source from the battery if the voltage of the power source is larger than a predetermined value. Because the processor can only receive 0V-5V, the voltage of the detecting signal equals to $1/10$ of the voltage of the power source. However, when the charging circuit charges a 12V battery, the voltage of the detecting signal equals to $1/10$ of the voltage of the 8V-22.5V power source. Therefore, the precision of the detecting signal is decreased.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout.

The FIGURE is a circuit diagram of an exemplary embodiment of a charging circuit.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the FIGURE, an exemplary embodiment of a charging circuit 100 for charging a battery 300 includes a processor 10, a voltage converter 20, a power voltage detecting circuit 30, a battery voltage detecting circuit 40, and a switching circuit 50.

A first terminal of the switching circuit 50 is connected to an anode Vcc+ of a power source 200. A second terminal of the switching circuit 50 is connected to a first output DO1 of the processor 10. A first terminal of the voltage converter 20 is connected to a third terminal of the switching circuit 50. A second terminal of the voltage converter 20 is connected to an anode IN+ of the battery 300. A cathode Vcc- of the power source 200 is connected to a cathode IN- of the battery 300.

The power voltage detecting circuit 30 includes a first resistor R1, a second resistor R2, a third resistor R3, a first switch SW1, a second switch SW2, and an inverter D1. A first terminal of the first resistor R1 is connected to the anode Vcc+ of the power source 200. A second terminal of the first resistor R1 is connected to a first contact T11 of the first switch SW1 through the second resistor R2. The second terminal of the first resistor R1 is also connected to a first contact T21 of the second switch SW2 through the third resistor R3. A second contact T12 of the first switch SW1 is connected to the cathode Vcc- of the power source 200. A control terminal C1 of the first switch SW1 is connected to a second output DO2 of the processor 10. A second contact T22 of the second switch SW2 is connected to the cathode Vcc- of the power source 200. A control terminal C2 of the second switch SW2 is connected to a cathode of the inverter D1. An anode of the inverter D1 is connected to the second output DO2 of the processor 10. A first input DI1 of the processor 10 is connected to a node between the resistors R1 and R3.

The battery voltage detecting circuit 40 includes a fourth resistor R4, a fifth resistor R5, a sixth resistor R6, a third switch SW3, and a fourth switch SW4. A first terminal of the fourth resistor R4 is connected to the anode IN+ of the battery 300. A second terminal of the fourth resistor R4 is connected to a first contact T31 of the third switch SW3 through the fifth resistor R5. The second terminal of the fourth resistor R4 is also connected to a first contact T41 of the fourth switch SW4 through the sixth resistor R6. A second contact T32 of the third switch SW3 is connected to the cathode IN- of the battery 300. A control terminal C3 of the third switch SW3 is connected to the second output DO2 of the processor 10. A second contact T42 of the fourth switch SW4 is connected to the cathode IN- of the battery 300. A control terminal C4 of the fourth switch SW4 is connected to the cathode of the inverter D1. A second input DI2 of the processor 10 is connected to a node between the resistors R4 and R5.

In one embodiment, the resistance of the first resistor R1 is 9 kilohms (KΩ), the resistance of the second resistor R2 is 1 KΩ, the resistance of the third resistor R3 is 2.25 KΩ, the resistance of the fourth resistor R4 is 4 KΩ, the resistance of the fifth resistor R5 is 1 KΩ, the resistance of the sixth resistor R6 is 2 KΩ.

The voltage converter 20 converts the voltage of the power source 200 to a standard voltage matching the battery 300 and charges the battery 300.

When the standard voltage of the battery 300 is 24 volts (V), the voltage range of the power source 200 needs to be 16V-45V. The second output DO2 of the processor 10 is set at a high voltage level. The control terminal C1 of the first switch SW1 is at a high voltage level and the first switch SW1 is turned on. The first contact T11 contacts the second contact T12 of the first switch SW1. At the same time, the cathode of the inverter D1 is at a low voltage level. The control terminal C2 of the second switch SW2 is at a low voltage level and the second switch SW2 is turned off. The first contact T21 does not contact the second contact T22 of the second switch SW2.

The control terminal C3 of the third switch SW3 is at a high voltage level and the third switch SW3 is turned on. The first contact T31 contacts the second contact T32 of the third switch SW3. At the same time, the control terminal C4 of the fourth switch SW4 is at a low voltage level and the fourth switch SW4 is turned off. The first contact T41 does not contact the second contact T42 of the fourth switch SW4.

The relationship of the voltage V1 of the first input DI1 of the processor 10, the voltage Vcc of the power source 200, the resistances of the resistors R1 and R2 is shown below.

$$V1 = Vcc \times R2/(R1+R2)$$

The voltage V1 of the first input DI1 of the processor 10 equals to $1/10$ of the voltage Vcc of the power source 200. That is, the voltage range of the voltage V1 of the first input DI1 is 1.6V-4.5V.

The relationship of the voltage V2 of the second input DI2 of the processor 10, the voltage VIN+ of the battery 300, the resistances of the resistors R4 and R5 is shown below.

$$V2 = VIN+ \times R5/(R4+R5)$$

The voltage V2 of the second input DI2 of the processor 10 equals to ⅓ of the voltage VIN+ of the battery 300. That is, the voltage range of the voltage V2 of the second input DI2 is 0V-4.8V.

When the voltage Vcc of the power source 200 is less than 16V, the voltage V1 of the first input DI1 is less than 1.6V. The processor 10 controls the switching circuit 50 to disconnect the power source 200 from the battery 300. When the voltage Vcc of the power source 200 is larger than 45V, the voltage V1 of the first input DI1 is larger than 4.5V. The processor 10 controls the switching circuit 50 to disconnect the power source 200 from the battery 300.

When the voltage Vcc of the power source 200 is between 16V-45V, the voltage V1 of the first input DI1 is between 1.6V-4.5V. The processor 10 controls the switching circuit 50 to connect the power source 200 to the battery 300. The processor 10 and the battery voltage detecting circuit 40 detect the voltage VIN+ of the battery 300. When the voltage VIN+ of the battery 300 equals to the standard voltage of the battery 300, the processor 10 controls the switching circuit 50 to disconnect the power source 200 from the battery 300.

When the standard voltage of the battery 300 is 12V, the voltage range of the power source 200 needs to be 8V-22.5V. The second output DO2 of the processor 10 is set at a low voltage level. The control terminal C1 of the first switch SW1 is at a low voltage level and the first switch SW1 is turned off. At the same time, the cathode of the inverter D1 is at a high voltage level. The control terminal C2 of the second switch SW2 is at a high voltage level and the second switch SW2 is turned on.

The control terminal C3 of the third switch SW3 is at a low voltage level and the third switch SW3 is turned off. At the same time, the control terminal C4 of the fourth switch SW4 is at a high voltage level and the fourth switch SW4 is turned on.

The relationship of the voltage V1 of the first input DI1 of the processor 10, the voltage Vcc of the power source 200, the resistances of the resistors R1 and R3 is shown below.

$$V1 = Vcc \times R3/(R1+R3)$$

The voltage V1 of the first input DI1 of the processor 10 equals to ⅕ of the voltage Vcc of the power source 200. That is, the voltage range of the voltage V1 of the first input DI1 is 1.6V-4.5V.

The relationship of the voltage V2 of the second input DI2 of the processor 10, the voltage VIN+ of the battery 300, the resistances of the resistors R4 and R6 is shown below.

$$V2 = VIN+ \times R6/(R4+R6)$$

The voltage V2 of the second input DI2 of the processor 10 equals to ⅓ of the voltage VIN+ of the battery 300. That is, the voltage range of the voltage V2 of the second input DI2 is 0V-4V.

When the voltage Vcc of the power source 200 is less than 8V, the voltage V1 of the first input DI1 is less than 1.6V. The processor 10 controls the switching circuit 50 to disconnect the power source 200 from the battery 300. When the voltage Vcc of the power source 200 is larger than 22.5V, the voltage V1 of the first input DI1 is larger than 4.5V. The processor 10 controls the switching circuit 50 to disconnect the power source 200 from the battery 300.

When the voltage Vcc of the power source 200 is between 8V-22.5V, the voltage V1 of the first input DI1 is between 1.6V-4.5V. The processor 10 controls the switching circuit 50 to connect the power source 200 to the battery 300. The processor 10 and the battery voltage detecting circuit 40 detect the voltage VIN+ of the battery 300. When the voltage VIN+ of the battery 300 equals to the standard voltage of the battery 300, the processor 10 controls the switching circuit 50 to disconnect the power source 200 from the battery 300.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A charging circuit for a battery, the charging circuit comprising:
   a processor comprising a first output, a second output, and a first input;
   a switching circuit comprising a first terminal connected to a power source, a second terminal connected to the first output of the processor, and a third terminal;
   a voltage converter comprising a first terminal connected to the third terminal of the switching circuit, and a second terminal connected to the battery, the voltage converter converting the voltage of the power source to a standard voltage matching the battery; and
   a power voltage detecting circuit comprising a first resistor, a second resistor, a third resistor, a first switch, a second switch, and an inverter, a first terminal of the first resistor is connected to an anode of the power source, a second terminal of the first resistor is connected to a first contact of the first switch through the second resistor, the second terminal of the first resistor is also connected to a first contact of the second switch through the third resistor, a second contact of the first switch is connected to a cathode of the power source, a control terminal of the first switch is connected to the second output of the processor, a second contact of the second switch is connected to the cathode of the power source, a control terminal of the second switch is connected to a cathode of the inverter, an anode of the inverter is connected to the second output of the processor, the first input of the processor is connected to a node between the first resistor and the third resistor;
   wherein upon a condition that a standard voltage of the battery equals to a first standard voltage, the second output of the processor outputs a first control signal to make the power voltage detecting circuit output a first sampling voltage to the first input of the processor, the first sampling voltage satisfies an equation as below: $V1 = Vcc \times R2/(R1+R2)$, V1 denotes the first sampling voltage, Vcc denotes the voltage of the power source, R1 denotes a resistance of the first resistor, and R2 denotes a resistance of the second resistor;
   wherein upon a condition that the standard voltage of the battery equals to a second standard voltage, the second output of the processor outputs a second control signal, to make the power voltage detecting circuit output a second sampling voltage to the first input of the processor, the second sampling voltage satisfies an equation as below: $V2=Vcc \times R3/(R1+R3)$, V2 denotes the second sampling voltage, and R3 denotes a resistance of the third resistor; and wherein the first input of the processor receives the first or second sampling voltage from the power voltage detecting circuit, the first output of the processor controls the switching circuit to disconnect the power source from the battery when the first or second sampling voltage is beyond a corresponding first predetermined range.

2. The charging circuit of claim 1, wherein the resistance of the first resistor is 9 kilohms (KΩ), the resistance of the second resistor is 1 KΩ, and the resistance of the third resistor is 2.25 KΩ.

3. The charging circuit of claim 1, wherein when the first control signal is at a high voltage level, the first contact contacts the second contact, and when the second control signal is at a low voltage level, the first contact does not contact the second contact.

4. The charging circuit of claim 1, further comprising a battery voltage detecting circuit, wherein the processor further comprises a second input, the battery voltage detecting circuit comprises a fourth resistor, a fifth resistor, a sixth resistor, a third switch, and a fourth switch, a first terminal of the fourth resistor is connected to an anode of the battery, a second terminal of the fourth resistor is connected to a first contact of the third switch through the fifth resistor, the second terminal of the fourth resistor is also connected to a first contact of the fourth switch through the sixth resistor, a second contact of the third switch is connected to a cathode of the battery, a control terminal of the third switch is connected to the second output of the processor, a second contact of the fourth switch is connected to the cathode of the battery, a control terminal of the fourth switch is connected to the cathode of the inverter, the second input of the processor is connected to a node between the fourth resistor and the fifth resistor;

wherein when the second output of the processor outputs the first control signal, the battery voltage detecting circuit outputs a third sampling voltage to the second input of the processor, the third sampling voltage from the battery voltage detecting circuit satisfies an equation as below: $V3=VIN \times R5/(R4+R5)$, V3 denotes the third sampling voltage, VIN denotes the voltage of the battery, R4 denotes a resistance of the fourth resistor, and R5 denotes a resistance of the fifth resistor; and wherein when the second output of the processor outputs the second control signal, the battery voltage detecting circuit outputs a fourth sampling voltage to the second input of the processor, the fourth sampling voltage from the battery voltage detecting circuit satisfies an equation as below: $V4=VIN \times R6/(R4+R6)$, V4 denotes the fourth sampling voltage, and R6 denotes a resistance of the sixth resistor;

wherein the second input of the processor receives the third or fourth sampling voltage from the battery voltage detecting circuit, the second output of the processor controls the switching circuit to disconnect the power source from the battery when the third or fourth sampling voltage is beyond a corresponding second predetermined range.

5. The charging circuit of claim 4, wherein the resistance of the fourth resistor is 4 kilohms (KΩ), the resistance of the fifth resistor is 1 KΩ, and the resistance of the sixth resistor is 2 KΩ.

6. The charging circuit of claim 4, wherein when the first control signal is at a high voltage level, the first contact contacts the second contact of each of the third and fourth switches, and when the second control signal is at a low voltage level, the first contact does not contact the second contact of each of the third and fourth switches.

* * * * *